Nov. 17, 1936. F. J. WESTROPE 2,060,915
UNIT SEALING AND GUIDE STRIP FOR GLASS RUN CHANNELS
Filed Sept. 30, 1932
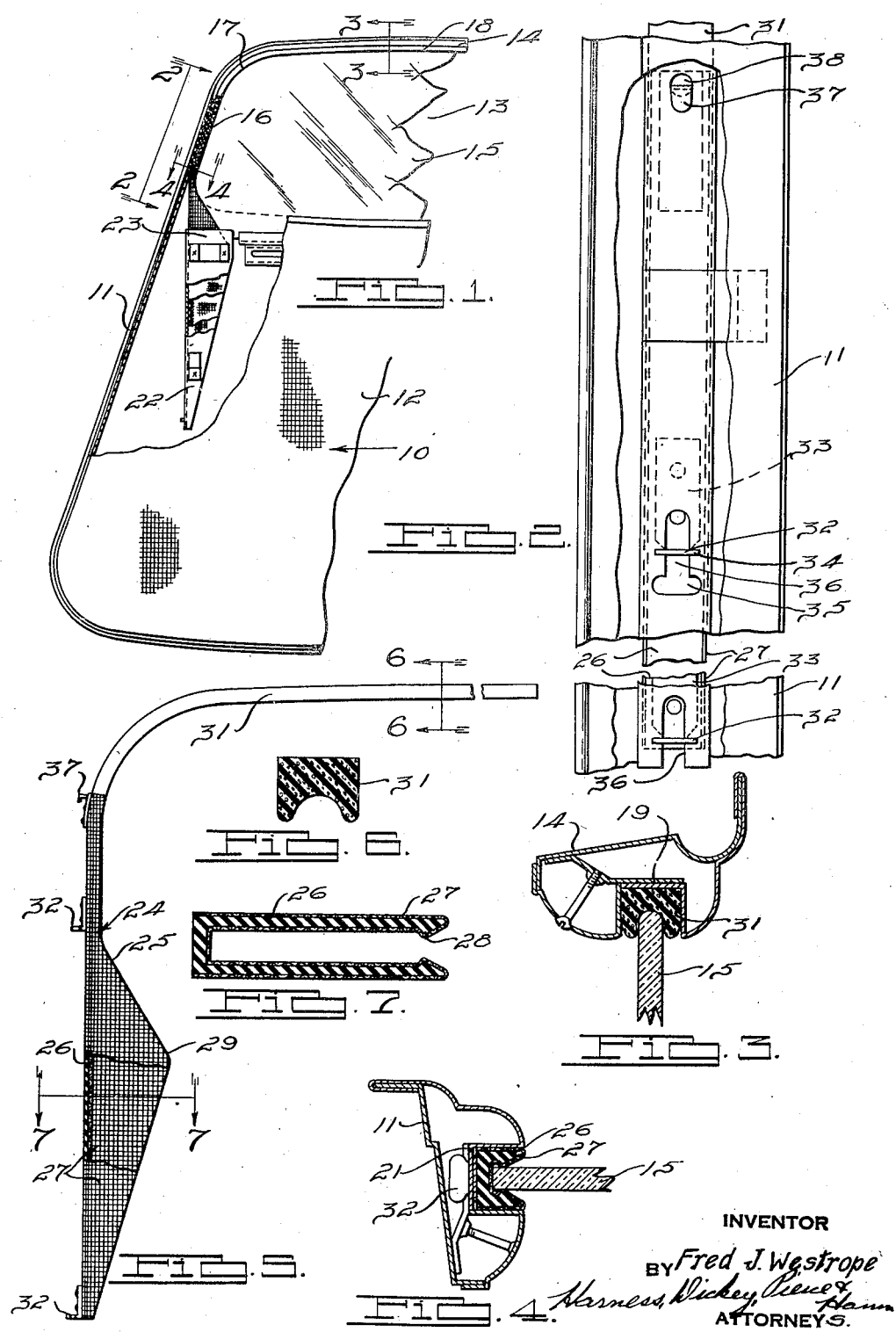
INVENTOR
BY Fred J. Westrope
ATTORNEYS.

Patented Nov. 17, 1936

2,060,915

UNITED STATES PATENT OFFICE 2,060,915

UNIT SEALING AND GUIDE STRIP FOR GLASS RUN CHANNEL

Fred J. Westrope, Detroit, Mich., assignor to The Murray Corporation of America, a corporation of Delaware Application September 30, 1932, Serial No. 635,659

9 Claims. (Cl. 296—44.5)

The invention relates to automotive vehicle body constructions and particularly to a glass run channel guiding and sealing strip which permits the readily raising and lowering of the window pane when encompassing the pane along its sliding edges and which seals the edges of the pane when in closed position.

When the openings in body and door constructions were of regular quadrilateral shapes the guiding and sealing of the pane which closed the opening was a comparatively simple undertaking. Upon the advent of the stream-line bodies having slanting front and rear portions, the window openings assumed shapes of various angle and curvature which resulted in major problems for guiding and encompassing the panes and of effectively sealing the edges of the panes when in raised position.

The main objects of my invention are: to provide a glass guide channel disposed about the edge of the window opening of a shape conforming to the window pane and which is extended below the opening and projected inwardly of the edges to receive the entire edge of the window pane; to provide a composite guiding and sealing strip as a unit element which is secured within the glass guide channel; to provide a unit guiding and sealing strip, the guiding portion of which is secured within the channel and shaped to conform to the extension of the channel below the window openings; and to extend above the portion of the channel in which the window pane slides and laterally across the top of the opening to effect a seal with the pane when in raised position; to provide a unit guiding and sealing strip for a glass run channel, the guiding portion of which is made of cushioning, non-friction material, the sealing portion of which is made of compressible material, preferably of sponge rubber; to provide a guiding and sealing strip for the channel about the edge of a window opening which encompasses and seals the window pane and which is simple in construction and economical of manufacture.

Other objects and features of novelty of my invention will be either specifically pointed out or will become apparent, upon referring, for a better understanding of my invention, to the following description taken in conjunction with the accompanying drawing, wherein:

Figure 1 is a broken view of a door of a vehicle which embodies features of my invention, Fig. 2 is an enlarged broken view of an edge of the door, taken along the line 2—2 of Fig. 1, Fig. 3 is an enlarged sectional view of the structure illustrated in Fig. 1, taken on the line 3—3 thereof, Fig. 4 is an enlarged sectional view of the structure illustrated in Fig. 1, taken along the line 4—4 thereabove, Fig. 5 is an enlarged view of a guiding and sealing strip of the glass run channel illustrated in Fig. 1 with a part broken away, Fig. 6 is a sectional view of the structure illustrated in Fig. 5, taken on line 6—6 thereof, and Fig. 7 is an enlarged sectional view of the structure illustrated in Fig. 5, taken on the line 7—7 thereof.

While the particular concept of my invention applies to all window openings in vehicle bodies, only one particular construction is shown, that of a window opening in a door which is of the present day conventional shape. The door 10 is illustrated in Fig. 1, as having a sloping front rail 11, and an inner panel 12, which extends substantially to the belt rail of the body, providing an opening 13 thereabove, and below the top rail 14. A window pane 15 is employed for closing the opening and is provided with a front sloping edge 16 which conforms to the slope of the rail 11, an arcuate corner 17 of comparatively sharp curvature and an upper arcuate edge 18 of considerably less curvature.

The conventional glass run channels 19 and 21 are provided respectively in the top rail 18 and in the upper portion of the front rail 11 of the door, as illustrated more particularly in Figs. 3 and 4. The particular form and method of construction of the channels forms no part of the present invention and will not be described further in detail.

A metal channel-shaped element 22 is secured between the panel 12 and the outside panel of the door, inwardly of the rail 11 and below the glass run channel 21 in line with the lower end thereof, to form a continuation of the glass run channel 21. The lower edge of the window glass 15 slides within the channel element 22 which is laterally extended at its upper portion at 23, to encompass the sloping edge 16 of the glass and to receive the greater portion of the arcuate edge 17. In this manner the entire front edge of the window glass is entirely encompassed within the glass run channel guiding strip when in lowered position, which prevents the rattling or breaking of the window pane 15.

Within the glass run channels 19, 21 and 22, a guide and sealing strip 24, illustrated enlarged in Fig. 5, is secured for cushioning, guiding and sealing the edge of the glass when being lowered or when in raised and lowered positions. Such a strip is illustrated, described and claimed in the co-pending application of O. F. Graebner, Serial No. 500,700, filed Dec. 8, 1930, and assigned to the assignee of the present invention. The strip 24 comprises a guide portion 25 which is composed of a comparatively hard rubber body 26, covered by a frictionless material 27, such as felt or the like. The outer edges of the rubber are extended at 28, for tightly engaging the glass to seal and secure the glass against breakage. The central portion of the guide strip 24 is laterally extended at 29 to be received within the extending portion of the channel element 22 and to closely encompass the front end of the window pane 15 when in lowered position.

With this construction, material support is always provided at the front edge of the window where heretofore only the foremost edge thereof was secured within a channel and as a result breakage, which often occurred to the window pane, is prevented.

The upper portion of the guide strip 24 is provided with a sealing strip 31 which is made of soft flexible material, such as sponge rubber, as illustrated in Figs. 3 and 6. When the window is moved upwardly within the guide strip 24, the last movement thereof causes it to move within the sealing strip 31, which is deformed when under pressure, as illustrated in Fig. 3, to tightly encompass the edge of the window pane. By having the sealing and guiding strip formed into a unit element, the element is practically hidden from view when disposed in the channel and forms a neat appearance, even though the rail of the door is of small dimensions.

Referring to Fig. 5, metal securing clips 32 are secured to the outer portion of the guide strip 24, one of which is illustrated enlarged in Fig. 2. The clip is of L shape, having a body portion 33 which is riveted or otherwise secured to the guide strip and a laterally extending head portion 34, which is received within an enlarged end 35 of a slot 36, provided in the base of the glass guide channel 21. At the lower end of the channel 22, the slot 36 therein has no enlarged opening 35, as the slot 36 extends to the edge of the channel. A hook clip 37 is provided at the top end of the guide strip 24, which is received by an aperture 38 in the base of the glass guide channel, being hooked thereover to secure the upper edge of the strip within the channel.

The clips 32 are first assembled within the slots 36, after which the hook 37 is inserted within the aperture 38. In this manner the strip portion 24 of the unit guiding and sealing strip is secured within the glass run channels 21 and 22. The sealing portion 31 of the strip, has the outer surface thereof glued or otherwise secured within the channel with the side surfaces free to move inwardly to permit the material to clamp the window pane edge, when the pane is forced thereagainst, as illustrated in Fig. 3. It is to be understood that a similar strip 24, or a strip similar to the strip 24 with the lateral projecting portion 29 omitted, may be secured at the opposite end of the strip 31 to have the entire guiding and sealing strip a unit element.

It is also to be understood that when the window pane follows the slanting path of the door, or a path conforming to the slope of the edge of the window pane, that the lateral projecting portions on the channel 22 and on the strip 24 may be omitted, in which case, the unit strip will have substantially the same lateral dimension throughout its length.

It will be seen that I have provided a unit guiding and sealing strip which is readily assemblable within the glass run channel about the window opening and which entirely encompasses the edge of the window pane when in closed position, and also encompasses the entire front edge of the pane when in lowered position. The material employed in the guiding portion of the strip cushions the strip and closely engages the surface of the window pane to protect it against shock and to prevent it from rattling. The upper sealing portion of the strip receives the upper edge of the window pane when in closed position to completely encompass and clamp the edge to seal it against the entrance of dust or moisture, and also protects the edge against shock.

While I have described and illustrated but a single embodiment of my invention, it will be apparent to those skilled in the art that various changes, additions, omissions and substitutions may be made therein without departing from the spirit and scope of my invention, as set forth in the accompanying claims.

I claim as my invention:

1. A unit strip to be received by the glass guide channel disposed about and below the window opening including, in combination, a guiding portion of channel shape the depth of which varies through the variation in the extension of the flanges thereof below the window opening, the edges of which project beyond the plane of the edges at the window opening, and a sealing portion secured to and in extension of said guiding portion.

2. A unit strip to be received by the glass guide channel disposed about and below the window opening including, in combination, a guiding portion made of rubber and having the side flanges extended below the window opening beyond the plane of extension at the window opening for encompassing the window pane when lowered, and a sealing portion made of rubber of greater cushioning and flexing properties secured to and in extension of said guiding portion.

3. A strip to be received by the glass guide channel disposed adjacent to and below the window opening including, in combination, a channel strip of rubber having flanges of predetermined dimension at its upper portion and of greater dimension at its medial portion, the edges of the medial portion extending beyond the plane of the edges at its upper portion and inwardly presenting lips disposed about the edge of said strip.

4. A strip to be received by the glass guide channel disposed adjacent to and below the window opening including, in combination, a channel strip of rubber having flanges of predetermined length at its upper portion and of greater length therebelow, the edges of the flanges of greater length extending beyond the plane of the edges of the flanges at the upper portion, inwardly presenting lips disposed about the edge of said strip, and material having non-frictional engagement with a window pane covering a greater portion of said strip.

5. A strip to be received by the glass guide channel disposed adjacent to and below the window opening including, in combination, a channel strip of rubber having flanges of predetermined length at its upper portion and of greater length therebelow, the edges of the flanges of greater length extending beyond the plane of the edges of the flanges at the upper portion, clips on the web portion of said strip to be received by apertures in said channel for securing said strip therein, and inwardly presenting lips disposed about the edge of said strip.

6. A strip to be received by the glass guide channel disposed adjacent to and below the window opening including, in combination, a channel strip of rubber having flanges of predetermined dimension at its upper portion and of greater dimension therebelow, the edges of the flanges of greater length extending beyond the plane of the edges of the flanges at the upper portion, clips on the web portion of said strip to be received by apertures in said channel for securing said strip therein, inwardly presenting lips disposed about the edge of said strip, and material having non-frictional engagement with a window pane covering a greater portion of said strip.

7. A unit strip to be received by a glass guide channel disposed above, at the side and below the window opening including, in combination, a guiding portion of channel shape the width of the web of which is substantially uniform while the sides below the window opening project outwardly beyond the plane of projection of the sides at the window opening.

8. A strip to be received by the glass guide channel disposed adjacent to and below the window opening including, in combination, a channel strip of rubber of varying depth effected by the increased extension of the side flanges of the strip below the window opening beyond the plane of extension at the window opening.

9. A strip to be received by the glass guide channel disposed adjacent to and below the window opening including, in combination, a channel strip of rubber of a predetermined depth adjacent to the window opening and a greater depth therebelow, the edges of the sides below the window opening extending beyond the plane of the edges at the window opening.

FRED J. WESTROPE.